R. J. EMORY.
SHUTTER MECHANISM FOR KINETOSCOPES.
APPLICATION FILED FEB. 25, 1914.
1,293,741.
Patented Feb. 11, 1919.
3 SHEETS—SHEET 1.
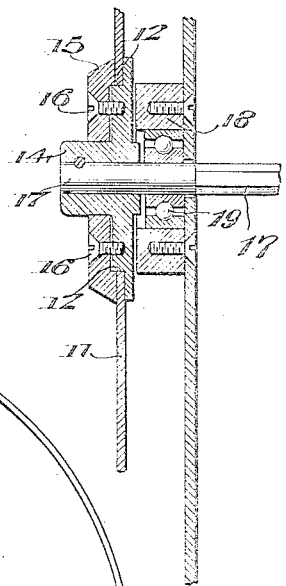
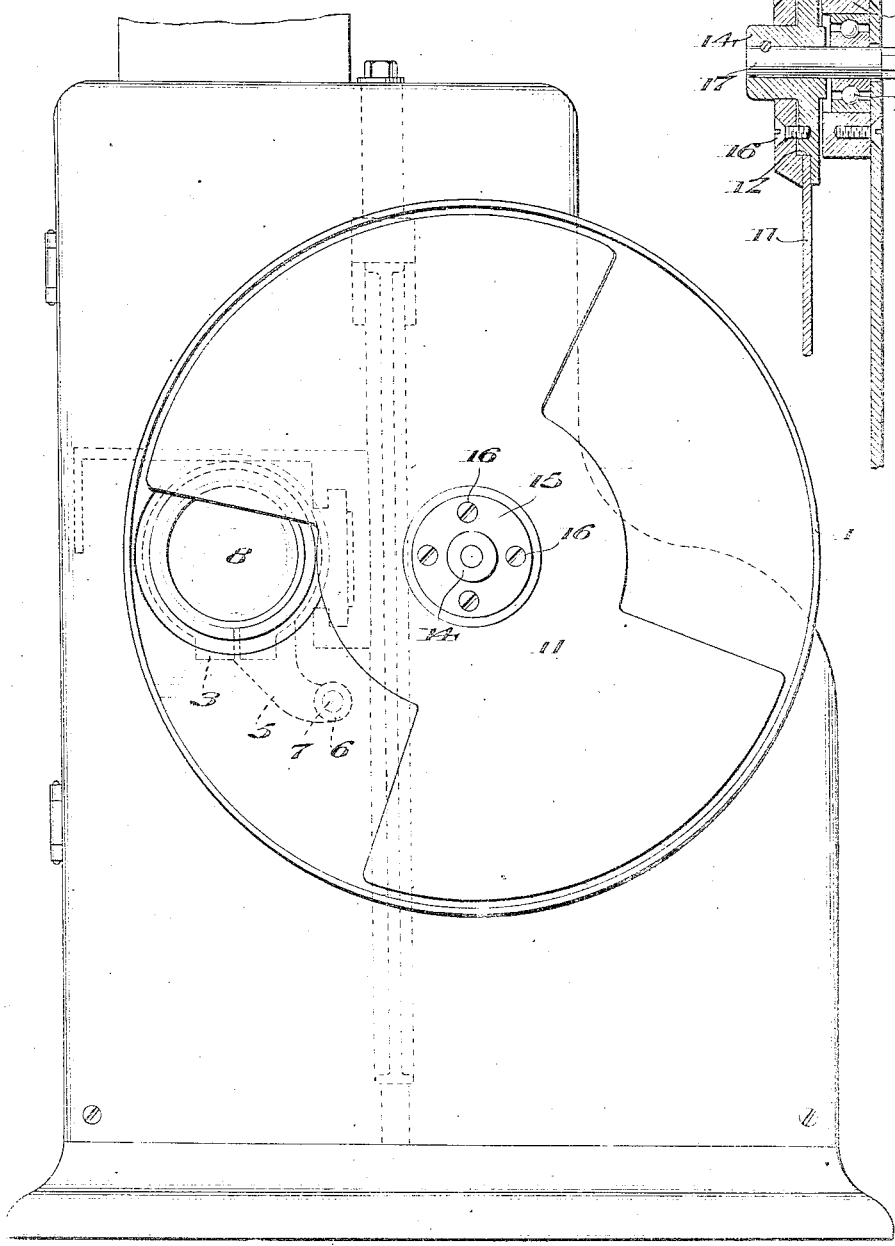

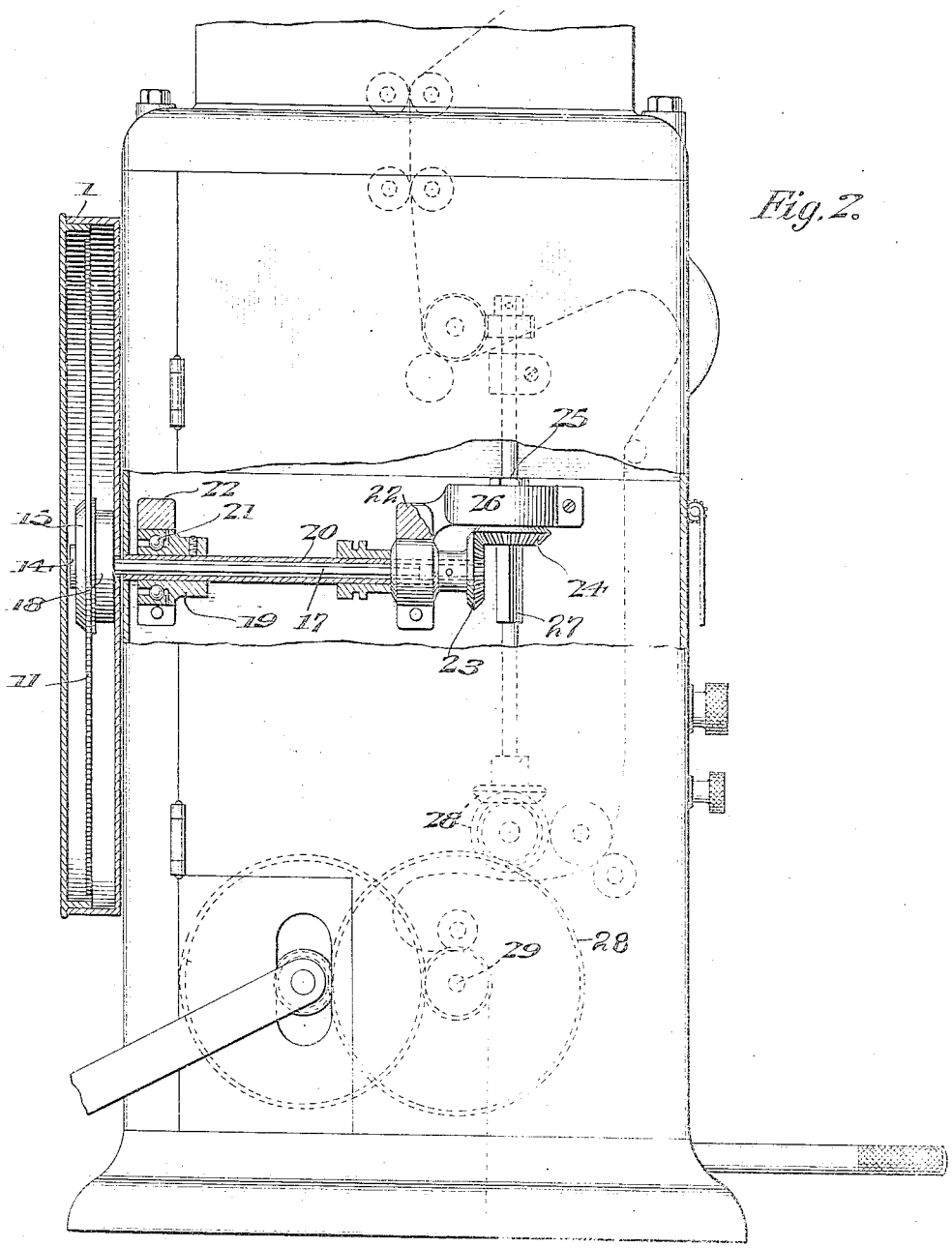

UNITED STATES PATENT OFFICE.

ROBERT J. EMORY, OF NEWARK, NEW JERSEY, ASSIGNOR TO BAIRD MOTION PICTURE MACHINE COMPANY, OF NEWARK, NEW JERSEY, A CORPORATION OF NEW JERSEY.

SHUTTER MECHANISM FOR KINETOSCOPES.

1,293,741. Specification of Letters Patent. Patented Feb. 11, 1919.

Application filed February 25, 1914. Serial No. 821,021.

*To all whom it may concern:*

Be it known that I, ROBERT J. EMORY, a citizen of the United States, residing in Newark, in the county of Essex, in the State of New Jersey, have invented certain new and useful Improvements in Shutter Mechanism for Kinetoscopes, of which the following is a specification.

My invention relates to improvements in shutter mechanism for kinetoscopes and relates particularly to means for mounting, adjusting and controlling the shutter and projection lens.

One of the objects of the invention is to provide means whereby adjustment of the lens automatically adjusts the shutter and its bearings.

A further object of my invention is to provide means whereby the shutter blades may be speedily adjusted with respect to the light aperture without disturbing the shutter shaft or any of the bearings therefor.

Various other objects of the invention will be shown and others will be more fully set forth in the following description of one form of mechanism embodying my invention which consists in the new and novel features of construction and combinations of parts hereinafter set forth and claimed.

In the accompanying drawings which show one form of mechanism embodying my invention, Figure 1 is a front elevation of a kinetoscope provided with one form of mechanism embodying my invention.

Fig. 2 is a side elevation partly in section of the driving mechanism for the shutter.

Fig. 3 is a detail sectional view showing the means for mounting the shutter blades upon the shutter shaft.

Figure 4:
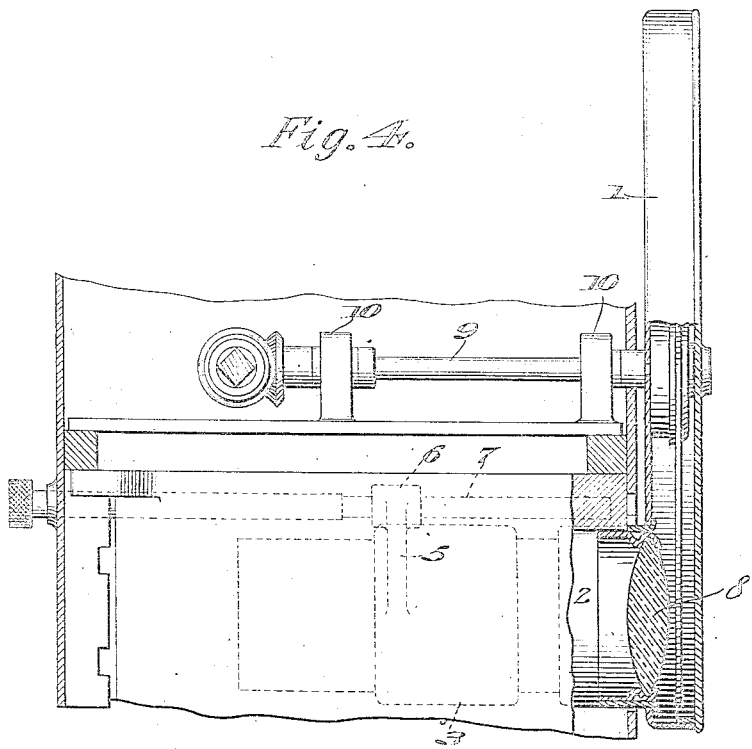
Fig. 4 is a plan view partly in section of the shutter and lens adjusting mechanism.
Figure 5:
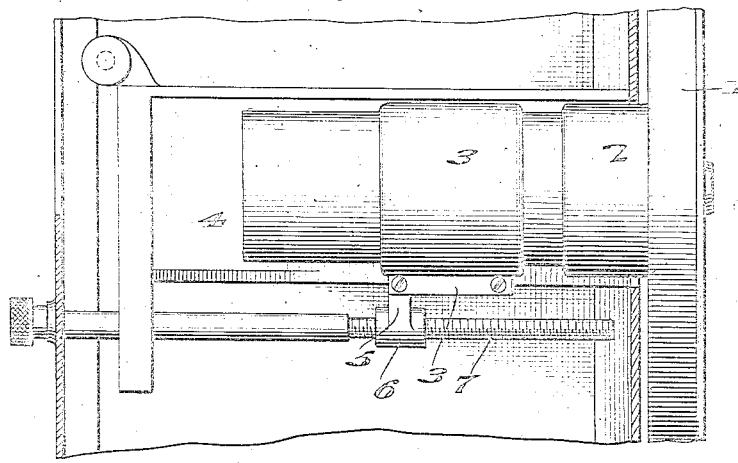
Fig. 5 is a side elevation of the same.

Referring to the accompanying drawings showing one form of mechanism embodying my invention, the shutter rotates in a casing 1 which is preferably integral with a sleeve 2 mounted in a clamp 3 movable on guides 4 provided on the frame of the machine. The clamp is provided with an arm 5 having a threaded eye 6 engaging with an adjustment screw 7, whereby the position of the casing and clamp may be determined. The projection lens is mounted in the sleeve and is adjustable therewith. The casing is also provided with a rod or bar 9, preferably arranged opposite the lens 8 that slides in suitable bearings 10 provided in the frame. Said rod serves to steady, and if desired, partly to support the casing.

The shutter 11 comprises two or more blades and is mounted on an annular shoulder 12 formed on a hub 14 keyed to the shutter shaft. The shutter is held in position on said shoulder by a locking ring 15 that is removably secured to the hub by any suitable means, as the screws 16.

The shutter shaft is formed of a plurality of sections that are telescopically connected to each other, the inner of which is non-circular. The end of the section 17 of the shutter shaft which carries the shutter is mounted in an annular bearing 18 secured to the casing by any suitable means. Preferably anti-friction devices 19 are provided between the bearing and said shaft section, which hold both the shaft section and the shutter in fixed relation to the casing. The telescoping section 20 of the shutter shaft is mounted in bearings provided on the frame, each comprising split clamping rings 22 which carry suitable anti-friction devices 21. The clamping rings permit the shaft and the anti-friction devices to be removed as a unit for replacement and repairs.

A gear 23 is secured to the inner end of the section 20 that meshes with a gear 24 provided on a hub 25, that is mounted in a suitable anti-friction bearing supported in a split clamping ring 26 that is arranged perpendicular to the clamping rings 22. The hub is provided with a squared eye to receive the squared portion of a vertical shaft 27 that is driven in any suitable manner, as the train of gears 28, from the main shaft 29 of the machine.

The optical requirement of a device of this character is that the lens should be as close to the shutter as possible in order that the shutter may cut off the ray of light where the ray has small cross sectional area. By placing the lens close to the shutter, the blades may be made narrow thereby giving more light on the screen. In the device of the character described the lens is advanced toward the shutter as far as is mechanically possible and this relation is preserved irrespective of the position of the lens after it has been focused, In operation, the shutter is rotated by means of the two part shaft from the main driving shaft through the intermeshed train of gears. The lens is focused by means of the adjusting screw which simultaneously acts on the casing to adjust the position of the shutter, together with the shutter shaft and the bearings therefor carried by the casing. As the part of the shaft which is attached to the shutter is free to move longitudinally in the telescoping part attached to the driving connection, the shutter and its casing may be adjusted with the lens while the shutter is rotated. The shutter can be readily adjusted on its shaft without interference with its connection with the driving mechanism by loosening the clamping plates containing the shutter there-between, rotating the shutter into its desired position relative to the shaft and reclamping the plates in binding engagement with the shutter in its adjusted position.

By means of this construction it is possible to attain an accurate focusing of the lens and at the same time maintain the shutter in a definite position relative to the lens, in all positions of the same. The shutter is at all times positively connected with the driving mechanism and the driving mechanism is entirely independent of the adjustment of the lens and shutter. The several parts are mounted so as to be conveniently dismembered for repair and substitution of parts.

It will be obvious that the invention embodies various other advantages not specifically set forth and that various changes may be made in the mechanism herein shown and described which are within the skill of the mechanic, and which are within the scope of my invention provided the means set forth in the following claims be employed.

I claim as my invention:—

1. In a shutter mechanism for kinetoscopes, the combination with a casing having a lens support formed integral therewith, of a shutter rotatable in said casing, a shaft supporting said shutter and having a bearing on the casing and means for driving said shaft permitting longitudinal movement of the shaft during rotation thereof.

2. In a kinetoscope, a support, a longitudinally movable shutter shaft, a fixed bearing for said shaft mounted on said support, a casing containing a shutter adjustable on said support in the direction of the length of said shaft, and a second antifriction bearing for said shaft carried by the rear wall of the casing, constituting a long bearing for the shaft, reinforcing the rear wall of the casing and movable therewith and with said shaft so as to keep the long bearing close to the shutter.

3. In a shutter mechanism for kinetoscopes, the combination of a shutter casing having a lens support formed integral therewith, a shutter shaft arranged in said casing, a hub on said shaft, a plurality of integral shutter blades mounted on said hub, means secured to said hub for holding said blades in adjusted position with relation thereto, means for rotating said shaft permitting independent axial movement thereof, and means for moving said casing.

4. In a shutter mechanism for kinetoscopes, the combination with a casing having a lens support formed integral therewith, a shutter shaft mounted on said casing, shutter blades mounted on said shaft and adjustable with relation thereto, a driving sleeve, of a means for rotating said sleeve, and a connection between said sleeve and shaft whereby the shaft may have independent movement with relation thereto, substantially as described.

5. In a kinetoscope, the combination with a lens casing and means for adjusting the same, of a projection shutter and a shaft for actuating the same, an inclosing casing for said shutter operatively connected with the adjustable lens casing so as to move therewith, said casing having a bearing for the shaft in close proximity to the shutter in all positions of the same.

6. In a kinetoscope, the combination with a casing, of a lens and a shutter both supported in said casing in fixed relation to each other, means for adjusting said casing and a two part shaft for driving the shutter, one of said parts telescoping in the other to permit relative longitudinal movement.

7. In a kinetoscope, the combination with a unitary casing adjustable in the direction of the light beam passing through the lens and constituting a shutter inclosing casing and a lens supporting means and manually controlled means for adjusting said casing.

8. In a kinetoscope, the combination with a unitary casing adjustable in the direction of the light beam passing through the lens and constituting a shutter inclosing means and a lens supporting means, a manually controlled means for adjusting said casing, and a shutter rotatably mounted in said adjustable casing in fixed relation thereto.

9. In a kinetoscope, the combination of a lens and a shutter, said lens and shutter being fixed relative to each other and means for simultaneously adjusting both lens and shutter to focus the lens.

10. In a kinetoscope, the combination of a lens and a shutter, means for focusing said lens, means for driving said shutter and a connection between said lens and shutter for maintaining the same in fixed position relative to each other.

11. In a kinetoscope, the combination of a shutter, a shaft for driving the same, a lens coöperatively acting with said shutter and means connecting said lens and shaft so that movement of the lens is transmitted to the shutter.

12. In a kinetoscope, the combination of an adjustable shutter, means for rotating said shutter in all positions of the same, an adjustable lens support, an extension from said lens support operatively connected to said shutter to move the same as the lens support is adjusted.

This specification signed and witnessed this 12th day of February, A. D. 1914.

ROBERT J. EMORY.

Signed in the presence of—
JOHN W. MEMMETT,
T. DeC. RUTH.